United States Patent [19]
Hansen et al.

[11] Patent Number: 5,978,865
[45] Date of Patent: Nov. 2, 1999

[54] SYSTEM FOR PERFORMING DMA TRANSFERS WHERE AN INTERRUPT REQUEST SIGNAL IS GENERATED BASED ON THE VALUE OF THE LAST OF A PLURALITY OF DATA BITS TRANSMITTED

[75] Inventors: John P. Hansen; Ronald W. Stence, both of Austin; Melanie D. Typaldos, Buda, all of Tex.

[73] Assignee: Advanced Micro Devices, Inc.

[21] Appl. No.: 08/775,262

[22] Filed: Feb. 4, 1997

[51] Int. Cl.[6] ........................................... G06F 13/32
[52] U.S. Cl. .............................. 710/22; 710/32; 710/260
[58] Field of Search .................................. 395/281, 306, 395/868; 345/526; 370/231, 412, 514; 710/71, 126, 48, 101; 712/201

[56] References Cited

U.S. PATENT DOCUMENTS

| | | | |
|---|---|---|---|
| 4,642,791 | 2/1987 | Mallozzi e tal. | 710/71 |
| 4,646,261 | 2/1987 | Ng | 345/526 |
| 4,974,223 | 11/1990 | Ancheta e al. | 370/514 |
| 5,197,129 | 3/1993 | Kayama et al. | 395/868 |
| 5,313,454 | 5/1994 | Bustini et al. | 370/231 |
| 5,325,493 | 6/1994 | Herrell et al. | 712/201 |
| 5,481,678 | 1/1996 | Kondo et al. | 395/281 |
| 5,633,865 | 5/1997 | Short | 370/412 |
| 5,761,453 | 6/1998 | Anderson et al. | 710/126 |

*Primary Examiner*—Thomas C. Lee
*Assistant Examiner*—Chien Yuan

*Attorney, Agent, or Firm*—Kevin L. Daffer; Mark L. Berrier; Conley, Rose & Tayon

[57] ABSTRACT

A microcontroller is presented which is configurable to transfer data to and from one or more asynchronous serial ports (ASPs) using direct memory access (DMA), and having hardware features which cause each ASP to notify the microprocessor core (i.e., execution unit) when a data frame having a last data bit equal to a predetermined value is received. Such hardware features allow the execution unit to determine when complete data packets are received. Each ASP is adapted to receive serial communication data, and is configurable to generate an internal DMA request signal in response to the serial communication data. The serial communication data is transmitted within data frames, wherein each data frame includes multiple data bits transmitted sequentially between a start bit and one or more stop bits. The last data bit of the multiple data bits is transmitted immediately before the one or more stop bits. Each ASP is configurable to generate an ASP interrupt request signal when the value of the last of the multiple data bits is equal to a predetermined value, preferably when the last data bit is set to 1 as commonly used to signal the beginning or end of a data packet. Each ASP includes at least one configuration register, the contents of which determine the operation of the ASP. Generation of the ASP interrupt request signal and the internal DMA request signal is determined by the contents of at least one bit position within the configuration register.

22 Claims, 8 Drawing Sheets

DMA Registers 42

| Control Register 76 |
|---|
| Transfer Count Reg. 78 |
| Dest. Addr. High Reg. 80 |
| Dest. Addr. Low Reg. 82 |
| Source Addr. High Reg. 84 |
| Source Addr. Low Reg. 86 |

FIG. 5

ICU Registers 44

- Int. Request Reg. 88
- Int. In-Service Reg. 90
- Interrupt Mask Reg. 92

SYSTEM FOR PERFORMING DMA TRANSFERS WHERE AN INTERRUPT REQUEST SIGNAL IS GENERATED BASED ON THE VALUE OF THE LAST OF A PLURALITY OF DATA BITS TRANSMITTED

BACKGROUND OF THE INVENTION

1. Field of the Invention

This invention relates to the manufacture of integrated circuits and more particularly to the manufacture of microcontrollers.

2. Description of the Relevant Art

A typical computer system includes a microprocessor secured within its own semiconductor device package and connected to several separately-packaged support circuits. The support circuits perform support functions such as communication functions and memory interface functions. A microcontroller is an integrated circuit which incorporates a microprocessor core along with one or more support circuits on the same monolithic semiconductor substrate (i.e., chip). Computer systems which employ microcontrollers may thus be formed using fewer semiconductor devices. Advantages of such systems include lower fabrication costs and higher reliabilities. Microcontrollers find applications in industrial and commercial products including control systems, computer terminals, hand-held communications devices (e.g., cellular telephones), photocopier machines, facsimile machines, and hard disk drives.

Figures 1A, 1B:
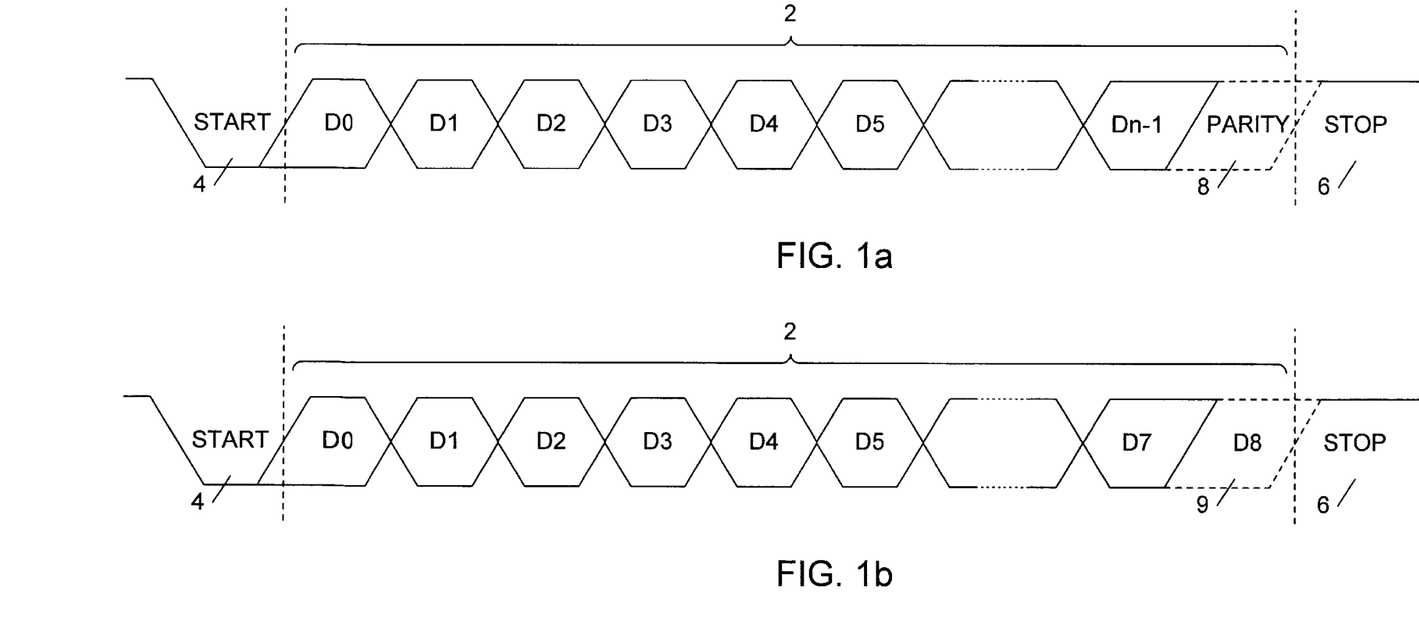
FIG. 1a is a diagram of a data frame used in asynchronous serial communication, wherein the frame includes multiple data bits transmitted between a start bit and one or more stop bits, and wherein the data bits include n bits of a data unit and an optional parity bit added for error detection.
FIG. 1b is a diagram of a data frame used by 9-bit serial protocols, wherein the multiple data bits of the data frame include 8 bits of the data unit and a ninth data bit in place of the optional parity bit.

Asynchronous serial communication is the standard means of transmitting data over distances greater than about 25 feet. In serial data communication, each unit of data (e.g., an 8-bit byte representing a character) is transmitted one bit at a time over a transmission medium (e.g., a pair of wires, a coaxial cable, etc.). FIG. 1a is a diagram of a data "frame" used in asynchronous serial communication. The data frame includes multiple data bits 2 transmitted between a "start" bit 4 and one or more "stop" bits 6. Data bits 2 include n bits of a data unit, $D_0$ through $D_{n-1}$ where n is typically 7 or 8, and an optional parity bit 8 which may be added to facilitate error detection. Start bit 4 is always a 0 and signals the beginning of the frame. The one or more stop bits 6 are always a 1 and signal the end of the frame. Start bit 4 and the one or more stop bits 6 are used to synchronize a transmitter and a receiver during asynchronous serial communication. The transmitter and receiver must both use the same set of rules designating how many bits are transmitted per second (i.e., the baud rate), how many bits are included in a data unit, whether a parity bit is included, and how many stop bits are added after the data bits.

Due to the prevalence of serial data communication, many microcontrollers include one or more asynchronous serial ports (ASPS) which can transmit and/or receive data one bit at a time. Such microcontrollers typically employ interrupt signals to notify the microprocessor core that an ASP requires service. An ASP typically issues an interrupt request signal when a data unit has been received by the ASP and needs to be transferred from the ASP to an external memory unit, or when the ASP has finished transmitting a data unit and the next data unit to be transmitted must be transferred from the external memory unit to the ASP.

The microprocessor core executes instructions of software programs. Upon receiving an interrupt request signal from the ASP, the microprocessor core stops program execution, saves the contents of certain critical registers (i.e., saves its internal state), and begins executing instructions of an appropriate interrupt service routine (i.e., an interrupt handler) associated with the ASP. When execution of the interrupt service routine is completed, the microprocessor core restores the saved contents of the critical registers (i.e., restores the internal state) and resumes execution of the interrupted program at the point where the interruption occurred.

When interrupts are used to service an ASP, the microprocessor core must first save its internal state and execute a portion of the instructions of the interrupt service routine. The amount of time required to perform these actions places an upper bound on the number of bits the ASP may transmit or receive each second (i.e., the maximum operational baud rate of the ASP). In addition, the microprocessor core must interrupt program execution in order to service the ASP, negatively impacting the performance of the microprocessor core.

Direct memory access (DMA) is a well known technique which allows data transfers without involving the microprocessor core. In addition, many microcontrollers include a DMA unit which controls DMA data transfer operations. The microprocessor core simply initializes control registers within the DMA unit with transfer control information. The transfer control information typically includes the first address of the source of the block of data to be transferred (i.e., the source address), the first address of the destination of the block of data to be transferred (i.e., the destination address), and the number of bytes or words to be transferred (i.e., the byte/word count).

When a device needs to transfer data, the device generates a DMA request signal. The DMA unit responds to the DMA request signal by gaining control of the common bus interconnecting the involved devices and initiating the data transfer operation. The DMA unit generates address and control signals needed to read a byte or word of data from the source address and to write the data to the destination address. After each read/write operation, the source and destination addresses and the byte/word count are either incremented or decrement. This process is continued until the data transfer operation is complete. When the data transfer operation is complete, the DMA unit relinquishes control of the common bus.

9-bit serial protocols are increasingly being used to transfer data using asynchronous serial communication. FIG. 1b is a diagram of a data frame used by 9-bit serial protocols. The data frame includes multiple data bits 2 transmitted between a "start" bit 4 and one or more "stop" bits 6. Data bits 2 include 8 bits of a data unit, $D_0$ through $D_7$, and a ninth data bit $D_8$, labeled 9 in FIG. 1b, in place of optional parity bit 8 (FIG. 1a). Ninth data bit 9 (bit $D_8$) is set to 1 to indicate the beginning and/or end of a message spanning multiple data units (i.e., the beginning and/or end of a data packet). 9-bit serial protocols are commonly used to manage communications between multiple microcontrollers coupled to a common transmission medium. In this case, each data packet typically includes one or more "header" frames at the beginning of the data packet. Each data packet may also include one or more "trailer" frames at the end of the data packet. One of the header frames typically includes a unique device identification (ID) number assigned to the intended receiver. The trailer frames may include, for example, the last data units of the data packet or a cyclic redundancy check (CRC) value for error detection. Ninth data bit 9 is set to 1 in the header and trailer frames and is set to 0 in other data packet frames.

It would thus be desirable to have a microcontroller which is configurable to transfer data to and from one or more ASPs using DMA, and having hardware features which notify the microprocessor core when complete data packets transmitted using a 9-bit serial protocol are received. DMA data transfers increase the maximum baud rate of each ASP and improve the performance of the microprocessor core during ASP operation. When the microprocessor core is involved in the transfer of serial communication data, the microprocessor core is able to determine the beginning and end of data packets transmitted using a 9-bit serial protocol. The use of DMA to accomplish such data transfers does not allow for such a determination. When DMA is used to transfer serial communication data transmitted using a 9-bit serial protocol, additional hardware features are needed to notify the microprocessor core when complete data packets are received.

SUMMARY OF THE INVENTION

The problems outlined above are in large part solved by a microcontroller which is configurable to transfer data to and from one or more asynchronous serial ports (ASPs) using direct memory access (DMA), the microcontroller also having hardware features which cause an ASP to notify the microprocessor core (i.e., execution unit) when a data frame having a last data bit equal to a predetermined value is received. Such hardware features allow the execution unit to determine when complete data packets are received. Each ASP is adapted to receive serial communication data, and is configurable to generate a DMA request signal internal to the microcontroller in response to the serial communication data. The serial communication data is transmitted within data frames, wherein each data frame includes multiple data bits transmitted sequentially between a start bit and one or more stop bits. The last data bit of the multiple data bits is transmitted immediately before the one or more stop bits. Each ASP is configurable to generate an ASP interrupt request signal when the value of the last of the multiple data bits is equal to a predetermined value. Each ASP is preferably configurable to generate the ASP interrupt request signal when the last of the multiple data bits is set to 1, the value commonly used to signal the beginning or end of a data packet.

Each ASP includes at least one configuration register, the contents of which determine the operation of the ASP. Generation of the ASP interrupt request signal by an ASP is determined by the contents of one or more bits within a first portion of the corresponding configuration register. The ASP interrupt request signal allows the use of DMA data transfers with serial communication data transmitted using, for example, a 9-bit serial protocol. The multiple data bits preferably include eight bits of a data unit and a last ninth data bit transmitted immediately before the one or more stop bits in accordance with 9-bit serial protocols.

Generation of the internal DMA request signal is determined by the contents of a one or more bits within a second portion of the ASP configuration register. In a receive mode, an ASP extracts a unit of serial communication data from a serial bit stream prior to generating the internal DMA request signal. In a transmit mode, an ASP transmits a serial communication data unit as a serial bit stream prior to generating the internal DMA request signal.

In addition to the one or more ASPs, the microcontroller also preferably includes an interrupt control unit (ICU), a DMA unit, and an execution unit. The execution unit is configured to execute instructions, preferably x86 instructions. The ICU is coupled to receive the ASP interrupt request signal and produces an interrupt request signal in response to the ASP interrupt request signal. The execution unit is coupled to receive the interrupt request signal and executes a predefined set of instructions in response to the interrupt request signal.

The DMA unit is coupled to receive the internal DMA request signal and perform a data transfer operation in response to the DMA request signal. During the DMA data transfer operation, the DMA unit reads data from a first address space and writes the data to a second address space. The DMA unit includes at least one configuration register, the contents of which determine the operation of the DMA unit. Each ASP is also preferably configurable to generate an ASP interrupt request signal upon the occurrence of certain internal conditions (e.g., parity error detected, framing error detected, overrun error detected, etc.) during a DMA data transfer operation.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
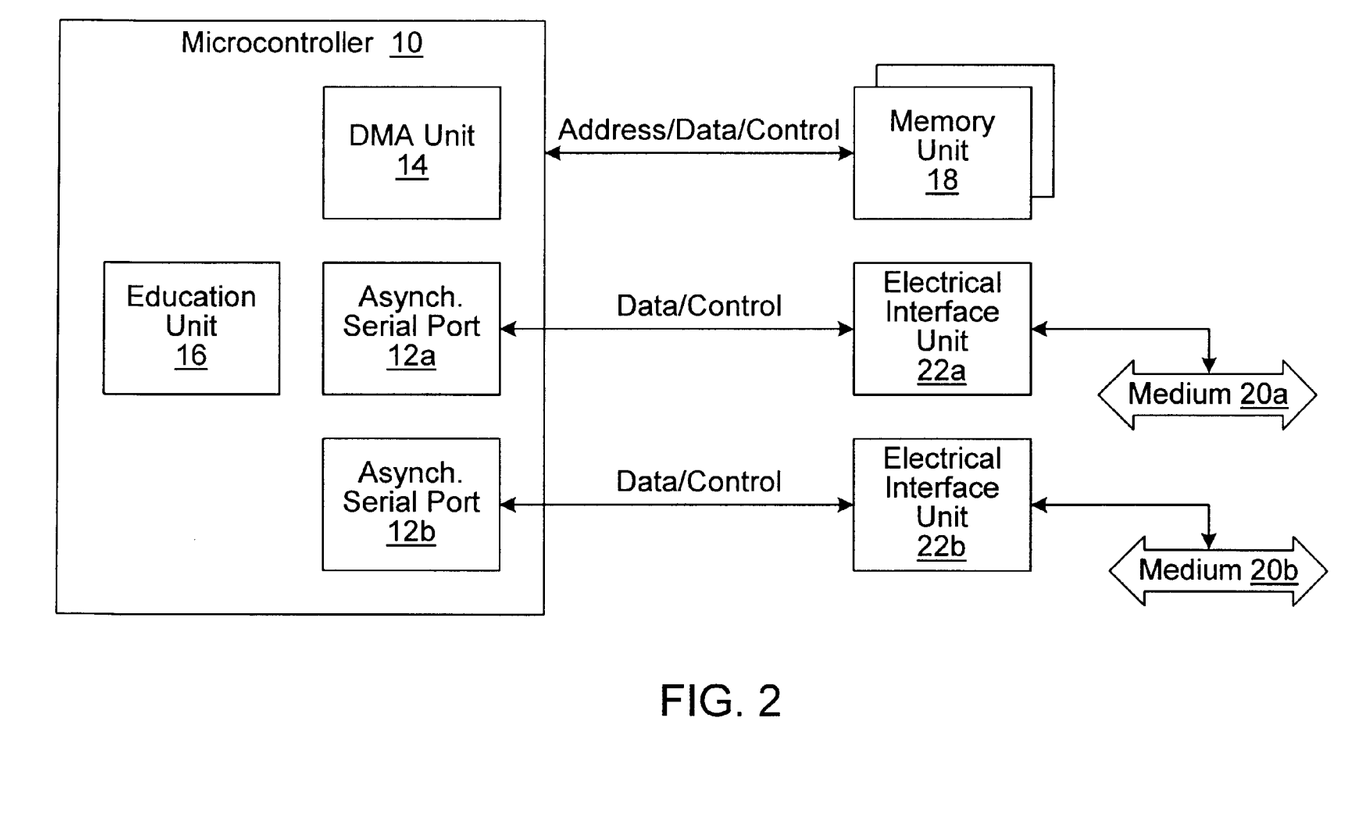
FIG. 2 is a block diagram of a system including a preferred embodiment of a microcontroller of the present invention.

FIG. 2 is a block diagram of a system including a preferred embodiment of microcontroller 10 of the present invention. Microcontroller 10 includes two independent asynchronous serial ports (ASPs) 12a and 12b, a direct memory access (DMA) unit 14, and an execution unit 16. Microcontroller 10 is coupled to one or more memory units 18 via address, data, and control signal lines. Execution unit 16 executes instructions stored within the one or more memory units 18 during operation of microcontroller 10. ASP 12a is coupled to a serial communication data transmission medium 20a via an electrical interface unit 22a, and ASP 12b is coupled to a serial communication data transmission medium 20b via an electrical interface unit 22b. ASP 12a is configurable to transmit serial communication data upon transmission medium 20a and/or to receive serial communication from transmission medium 20a. Similarly, ASP 12b is configurable to transmit serial communication data upon transmission medium 20b and/or to receive serial communication from transmission medium 20b. DMA unit 14 performs a DMA technique, transferring data between devices without involving execution unit 16. DMA unit 14 is preferably used to transfer data between ASPs 12a–b and the one or more memory units 18. For example, ASP 12a may be configured to transmit serial communication data upon transmission medium 20a and ASP 12b may be configured to receive serial communication data from transmission medium 20b. A transmit data buffer may be defined within the one or more memory units 18 to store data to be transmitted by ASP 12a, and a receive data buffer may be defined within the one or more memory units 18 to store data received by ASP 12b. DMA unit 14 may be configured to transfer serial communication data from the transmit data buffer to ASP 12a, and to transfer serial communication data received by ASP 12b to the receive data buffer, without the involvement of execution unit 16. Thus ASPs 12a–b may operate without significantly impacting the operation of execution unit 16.

Figure 3:
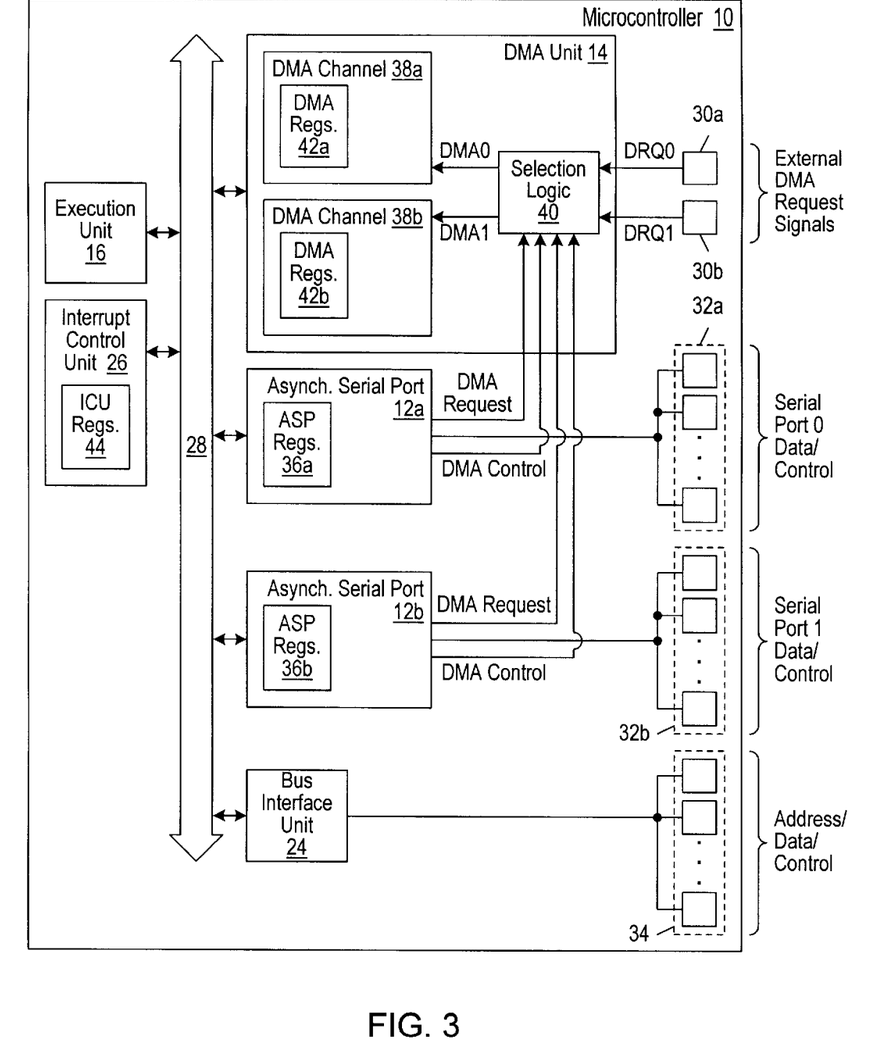
FIG. 3 is a block diagram of a preferred embodiment of the microcontroller of FIG. 2, wherein the microcontroller includes two asynchronous serial ports (ASPs), a DMA unit, an interrupt control unit (ICU), and an execution unit, all formed upon a single monolithic semiconductor substrate.

FIG. 3 is a block diagram of a preferred embodiment of microcontroller 10 of FIG. 2. Microcontroller 10 includes ASPs 12a–b, DMA unit 14, and execution unit 16 as well as a bus interface unit (BIU) 24, an interrupt control unit (ICU) 26, a core bus 28, a first input/output (I/O) pad 30a, a second I/O pad 30b, a first set of I/O pads 32a, a second set of I/O pads 32b, and a third set of I/O pads 34, all formed upon a single monolithic semiconductor substrate (i.e., a chip).

During manufacture of microcontroller 10, signal lines to be connected to external signal lines are terminated at flat metal contact regions (i.e., I/O pads) located upon an exposed surface of the chip. Following manufacture, microcontroller 10 is typically secured within a protective semiconductor device package. Each I/O pad is then connected to a terminal (e.g., a pin) of the device package by a signal line (e.g., a wire). Some I/O pads only convey output signals (e.g., address signals and output control signals). Other I/O pads carry only input signals (e.g., input control signals). Still other I/O pads convey both input and output signals (e.g., data signals). I/O pads carrying input signals typically have associated buffer circuits which drive voltage levels present upon the I/O pads onto corresponding internal signal lines of microcontroller 10. I/O pads carrying output signals typically have associated driver circuits which drive voltage levels present upon internal signal lines of microcontroller 10 onto the corresponding I/O pads.

Core bus 28 includes multiple signal lines for conveying signals. ASPs 12a–b, DMA unit 14, execution unit 16, BIU 24, and ICU 26 are coupled to core bus 28, and communicate via signal lines of core bus 28. Execution unit 16 executes microprocessor instructions, preferably from an instruction set of an x86 microprocessor. BIU 24 is coupled to the third set of I/O pads 34. Members of the third set of I/O pads 34 are intended to be connected to corresponding signal lines of external address, data, and control buses. BIU 24 handles all data transfers between microcontroller 10 and external devices (e.g., the one or more memory units 18 of FIG. 2, one or more I/O devices, etc.) coupled to the address, data, and control buses. BIU 24 contains multiple data buffers and is configured to implement established protocols in order to accomplish data transfers. BIU 24 generates address, data, and control signals, and drives the signals onto corresponding members of the third set of I/O pads 34 and onto the connected signal lines of the external address, data, and control buses.

ASP 12a is coupled to the first set of I/O pads 32a, and ASP 12b is coupled to the second set of I/O pads 32b. Members of the first and second sets of I/O pads 32a–b convey serial communication data and control signals, and are intended to be coupled to external signal lines. Each ASP 12 is typically coupled to a serial communication data transmission medium (e.g., a pair of wires, a coaxial cable, etc.) via an electrical interface unit as shown in FIG. 2. Each ASP 12 is configurable to transmit serial communication data upon the associated transmission medium and/or to receive serial communication data from the associated transmission medium. ASP 12a includes a first set of ASP registers 36a, and ASP 12b includes an identical second set of ASP registers 36b. Each set of ASP registers 36 includes multiple registers, the contents of which determine the operation of the corresponding ASP 12.

In the preferred embodiment of FIG. 3, DMA unit 14 includes two DMA channels 38a–b and selection logic 40. Once properly configured, each DMA channel 38 is capable of transferring data between two ranges of the address space of microcontroller 10 without the involvement of execution unit 16. The address space of microcontroller 10 is $2^n$, where n is the number of address signals simultaneously generated by BIU 24. For example, a microcontroller having 20 address pins may generate $2^{20}$ unique memory addresses and thus access $2^{20}$ unique memory locations (i.e., 1,048,576 memory locations or a 1 megabyte address space). DMA channel 38a includes a first set of DMA registers 42a, and DMA channel 38b includes an identical second set of DMA registers 42b. Each set of DMA registers 42 includes multiple registers, the contents of which determine the operation of the corresponding DMA channel 38. DMA registers 42 are programmed with a source address, a destination address, and a transfer count defining the number of data units (e.g., bytes) to be transferred.

For example, one or more memory units may be coupled to BIU 24 via external address, data, and control signal lines, ASP 12a may be configured to transmit serial communication data upon a first transmission medium, and ASP 12b may be configured to receive serial communication data from a second transmission medium. Two data buffers having different address ranges may be defined within the one or more memory units: a transmit data buffer to store data to be transmitted by ASP 12a and a receive data buffer to store data received by ASP 12b. DMA channel 38a may be configured to transfer data from the transmit data buffer address range to the range of addresses assigned to ASP 12a. DMA channel 38b may be configured to transfer data from the range of addresses assigned to ASP 12b to the receive data buffer address range. ASPs 12a–b thus perform serial data communication operations without significantly impacting the operation of execution unit 16.

Each ASP 12 is configurable to generate an internal DMA request signal and DMA control signals. I/O pads 30a and 30b are intended to convey external DMA request signals, DRQ0 and DRQ1, respectively, generated by external devices. Selection logic 40 of DMA unit 14 is coupled to receive the two internal DMA request signals, the DMA control signals, and the two external DMA request signals DRQ0 and DRQ1. Selection logic 40 is configured to produce two DMA request signals, DMA0 and DMA1. As will be described in more detail below, DMA0 is either the external DMA request signal DRQ0 or the internal DMA request signal produced by ASP 12a or ASP 12b dependent upon the DMA control signals. Similarly, DMA1 is either the external DMA request signal DRQ1 or the DMA request signal produced by ASP 12a or ASP 12b dependent upon the DMA control signals. DMA channel 38a is coupled to receive DMA0, and is configurable to perform a data transfer operation in response to the assertion of DMA0. DMA channel 38b is coupled to receive DMA1, and is configurable to perform a data transfer operation in response to the assertion of DMA1.

Each ASP 12 is configurable to generate an ASP interrupt request signal under certain conditions which require the execution of software service routines by execution unit 16, including error conditions occurring during serial data communication operations. Each DMA channel 38 is also configurable to generate a DMA interrupt request signal when a data transfer operation is complete. ICU 26 receives the ASP and DMA interrupt request signals via signal lines of core bus 28. Upon receiving ASP or DMA interrupt request signals, ICU 26 prioritizes the interrupt request signals and produces an interrupt request signal identifying the highest priority interrupt request. Execution unit 16 receives the interrupt request signal via a signal line of core bus 28. Upon receiving the interrupt request signal, execution unit 16 stops program execution, saves the contents of certain critical registers (i.e., saves its internal state), and begins executing instructions of the appropriate interrupt service routine (i.e., an interrupt handler). When execution of the interrupt service routine is completed, execution unit 16 restores the saved contents of the critical registers (i.e., restores the internal state) and resumes execution of the interrupted program at the point where the interruption occurred. ICU 26 includes multiple ICU registers 44, the contents of which determine the operation of ICU 26.

Figure 4A:
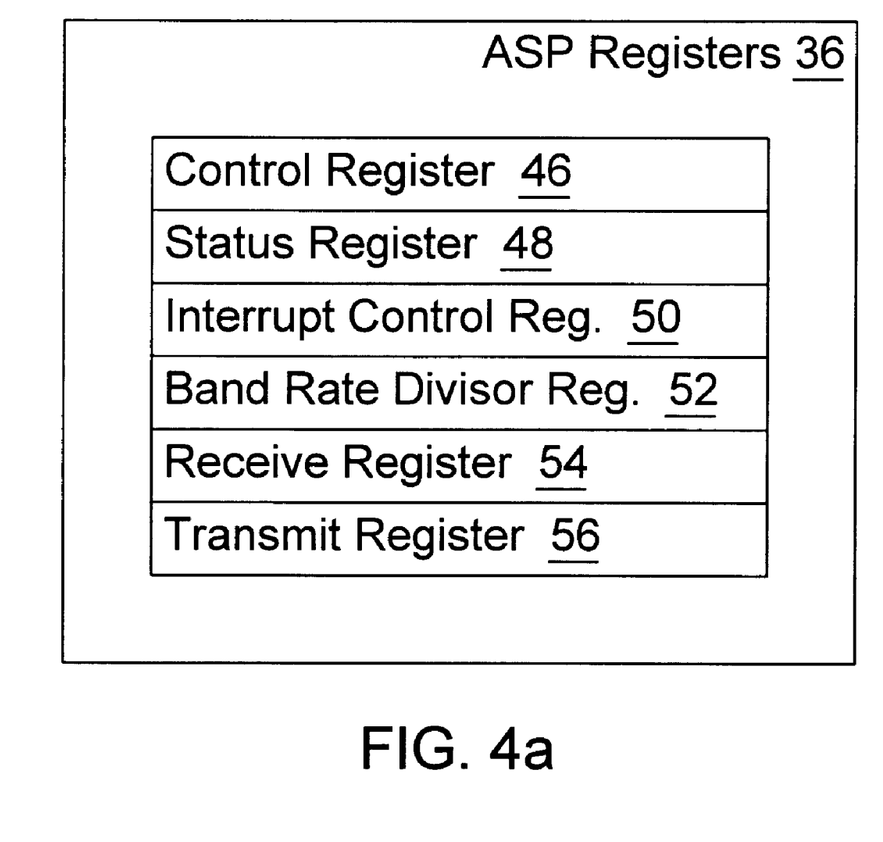
FIG. 4a is a block diagram of a preferred embodiment of ASP registers included within each ASP of FIG. 3.

FIG. 4a is a block diagram of a preferred embodiment of ASP registers 36 included within each ASP 12. ASP registers 36 include a control register 46, a status register 48, an interrupt control register 50, a baud rate divisor register 52, a receive register 54, and a transmit register 56. The contents of control register 46 control both the transmit and receive operations of the corresponding ASP 12. The contents of status register 48 provide information about the current status of the corresponding ASP 12. The contents of interrupt control register 50 determines whether the corresponding ASP 12 may generate an interrupt request signal and the priority of the interrupt request signal relative to other interrupt request signals. The contents of baud rate divisor register 52 determine the amount of time allotted to each bit of serial communication data during operation of the corresponding ASP 12. Receive register 54 contains serial communication data received by the corresponding ASP 12. Serial communication data to be transmitted by the corresponding ASP 12 is written into transmit register 56.

Figure 4B:
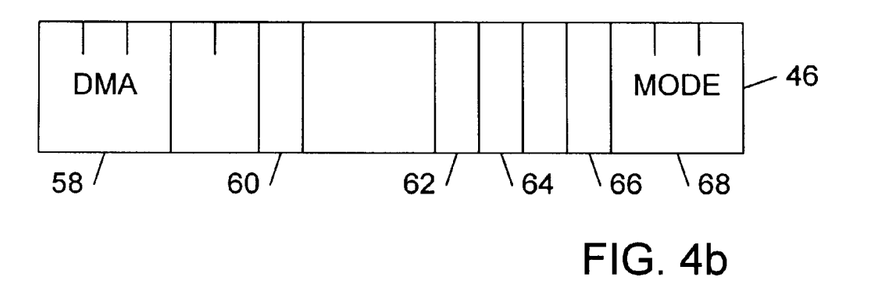
FIG. 4b is a block diagram of a preferred embodiment of a control register of the ASP registers of FIG. 4a, wherein the control register includes a DMA control field which configures the corresponding ASP for DMA transfers and a mode of operation field which determines the operating mode of the ASP, and wherein an operating mode of the ASP causes the ASP to generate an interrupt request signal when serial communication data is received having the ninth data bit set to 1.

FIG. 4b is a block diagram of a preferred embodiment of control register 46 of ASP registers 36. Control register 46 includes three contiguous bit positions forming a DMA control field 58, a transmit bit 8 (TB8) bit 60, a transmit mode enable bit 62, a receive mode enable bit 64, a parity enable bit 66, and three contiguous bit positions forming a mode of operation control field 68.

The three bits of the DMA control field configure the corresponding ASP 12 for DMA transfers according to Table 1 below:

TABLE 1

DMA Control Field Definition.

| Contents | Receive Mode DMA Request Signal | Transmit Mode DMA Request Signal |
| --- | --- | --- |
| 000 | (None) | (None) |
| 001 | DMA0 | DMA1 |
| 010 | DMA1 | DMA0 |
| 011 | (Reserved) | (Reserved) |
| 100 | DMA0 | (None) |
| 101 | DMA1 | (None) |
| 110 | (None) | DMA0 |
| 111 | (None) | DMA1 |

The contents of TB8 bit 60 is transmitted as the ninth data bit (bit $D_8$ in FIG. 1b) in operational modes supporting serial communication data units having nine data bits (bits $D_0$–$D_8$ in FIG. 1b). When transmit mode enable bit 62 is 1, transmit operation is enabled, and the corresponding ASP 12 is configured to transmit serial communication data. When receive mode enable bit 64 is 1, receive operation is enabled, and the corresponding ASP 12 is configured to receive serial communication data. Parity enable bit 66 enables parity checking when set to 1 and disables parity checking when set to 0.

The three bits of the mode of operation field 68 determine the operating mode of the corresponding ASP 12 according to Table 2 below:

TABLE 2

Mode Of Operation Field Definition.

| Contents | Mode | Data Bits Supported |
|---|---|---|
| 000 | 0 | (Reserved) |
| 001 | 1 | 7 or 8 |
| 010 | 2 | 9 |
| 011 | 3 | 8 or 9 |
| 100 | 4 | 7 |
| 101 | 5 | (Reserved) |
| 110 | 6 | (Reserved) |
| 111 | 7 | 9 |

When configured for receive operation in mode 2, ASP 12 will not complete a data frame reception unless the ninth data bit of the data frame (bit $D_8$ in FIG. 1b) is set to 1. Any data frame received in mode 2 with the ninth data bit set to 0 is ignored. ASP 12 may be configured by execution unit 16 to generate the ASP interrupt request signal when a data frame is received in mode 2. When configured for transmit operation in mode 2 and parity enable bit 66 is set to 0, the ninth data bit for data frame transmission is the value of TB8 bit 60 in control register 46. Control register 46 is assigned an address within the address space of microprocessor 10. The ninth data bit of a data frame is set to 1 by writing a value to control register 46 having a 1 in the TB8 bit 60 position.

Figure 4C:
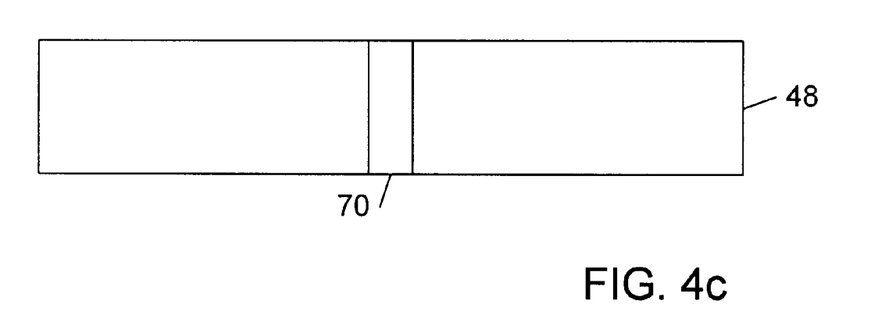
FIG. 4c is a block diagram of a preferred embodiment of a status register of the ASP registers of FIG. 4a, wherein the status register includes a received bit 8 (RB8) bit used to store the ninth data bit of received serial communication data.

Mode 3 supports data frames having nine data bits, and also supports parity checking. When configured for receive operation in mode 3, ASP 12 stores the ninth data bit (bit $D_8$ in FIG. 1b) in a received bit 8 (RB8) bit within status register 48. When configured for transmit operation in mode 3 an parity enable bit 66 is set to 0, automatic parity bit generation and transmission is disabled, and the ninth data bit for transmission is determined by the value of TB8 bit 60 in control register 60. The ninth data bit of a data frame may be set to 1 by writing a value to control register 46 having a 1 in the TB8 bit 60 position.

Mode 7 is identical to mode 3, except that parity checking is not supported and ASP 12 generates the ASP interrupt request signal when receive operation is enabled and a data frame is received having the ninth data bit set to 1.

Modes 2 and 3 may be used in conjunction to receive serial communication data transmitted using a 9-bit serial protocol (e.g., multidrop communications). In this case, parity must be disabled, and execution unit 16 must execute a software routine following the receipt of each data frame. The software routine must examine the data bits of each received data frame and respond appropriately when the ninth data bit is set. DMA data transfer cannot be unless microcontroller 10 is able to determine the length of a complete data packet. Although data packet length information may be transmitted in one or more header frames, 9-bit serial protocols do not explicitly provide support for DMA data transfers.

Modes 2 and 7 may be used in conjunction and with DMA data transfers to receive serial communication data transmitted using a 9-bit serial protocol. In this case, execution unit 16 first configures ASP 12 for receive operation in mode 2. ASP 12 is preferably also configured to generate the ASP interrupt request signal when a data frame is received. When a data frame having the ninth data bit set to 1 (i.e., a header frame) is received while in mode 2, the ASP 12 generates the ASP interrupt signal. Upon receiving the ASP interrupt request signal from ASP 12 via ICU 26, execution unit 16 executes an interrupt service routine including instructions which processes the data. For example, bits $D_0$–$D_7$ of the header frame may contain the address of the intended receiver. In this case, the execution unit compares bits $D_0$–$D_7$ of the header frame to the unique device ID assigned to ASP 12. If bits $D_0$–$D_7$ of the header frame do not match the ASP 12 device ID, the data packet is not intended for ASP 12, and ASP 12 should ignore the data packet and remain in mode 2. If, however, bits $D_0$–$D_7$ of the received data byte match the ASP 12 device ID, the data packet is intended for ASP 12, and ASP 12 should receive the multiple data frames including the data packet. Execution unit 16 should configure ASP 12 for operation in mode 3, and configure ASP 12 and a DMA channel 38 to transfer received serial communication data from ASP 12 to, for example, a receive data buffer within an external memory unit coupled to microcontroller 10. When ASP 12 receives the trailer frame having the ninth data bit set to 1 while operating in mode 3, ASP 12 will again generate the ASP interrupt request signal, and execution unit 16 will receive the ASP interrupt request signal via ICU 26. Instructions of the interrupt service routine should cause execution unit 16 to recognize the reception of a complete data packet and to take appropriate action (e.g., prepare the data packet for processing).

When transmit operation of an ASP 12 is enabled and transmit data is to be transferred using DMA, the ASP 12 generates an internal DMA request signal following transmission of a unit of serial communication data (i.e., when transmit register 56 is empty). When receive operation of an ASP 12 is enabled and receive data is to be transferred using DMA, the ASP 12 generates an internal DMA request signal when serial communication data is received (i.e., when receive register 54 is full). Each ASP 12 also produces DMA control signals which reflect the contents of DMA control field 58 of the corresponding control register 46. As described above, selection logic 40 of DMA unit 14 receives the internal DMA request signals and the DMA control signals. Selection logic 40 produces the two DMA request signals, DMA0 and DMA1, according to the internal DMA request signals and the DMA control signals.

For example, assume ASP 12a is configured to transmit serial communication data upon a first transmission medium, ASP 12b is configured to transmit serial communication data upon a second transmission medium, and data transfers between a transmit data buffer and a receive data buffer within an external memory unit are to be accomplished using DMA. Within control register 46 of ASP 12a, transmit mode enable bit 62 is 1, receive mode enable bit 64 is 0, and DMA control field 58 contains 116. When transmit register 56 within ASP 12a is empty, ASP 12a generates an internal DMA request signal. Based upon the DMA control signals generated by ASP 12a, select logic 40 generates DMA request signal DMA0 when the internal DMA request signal from ASP 12a is received. Thus a properly configured DMA channel 38a is used to transfer serial communication data from the transmit data buffer to ASP 12a for transmission. Within control register 46 of ASP 12b, transmit mode enable bit 62 is 0, receive mode enable bit 64 is 1, and DMA control field 58 contains 101. When receive register 54 within ASP 12b is full, ASP 12b generates an internal DMA request signal. Based upon the DMA control signals generated by ASP 12b, Select logic 40 generates DMA request signal DMA1 when the internal DMA request signal from ASP 12b is received. Thus a properly configured DMA channel 38b is used to transfer serial communication data from ASP 12b to the receive data buffer.

When select logic 40 generates a DMA request signal DMA0 or DMA1, the corresponding external DMA request signal DRQ0 or DRQ1 is disabled. When not designated for use by ASPs 12a–b, DMA request signal DMA0 or DMA1 is produced by select logic 40 in response to a received corresponding external DMA request signal DRQ0 or DRQ1. For example, assume ASP 12a is configured to transmit serial communication data upon a first transmission medium, ASP 12b is not in use, and data transfers from a transmit data buffer within an external memory unit to ASP 12a are to be accomplished using DMA. Within control register 46 of ASP 12a, transmit mode enable bit 62 is 1, receive mode enable bit 64 is 0, and DMA control field 58 contains 116. When transmit register 56 within ASP 12a is empty, ASP 12a generates an internal DMA request signal. Based upon the DMA control signals generated by ASP 12a, select logic 40 generates DMA request signal DMA0 when the internal DMA request signal from ASP 12a is received. Thus a properly configured DMA channel 38a is used to transfer serial communication data from the transmit data buffer to ASP 12a for transmission. Within control register 46 of ASP 12b, transmit mode enable bit 62 is 0, receive mode enable bit 64 is 0, and DMA control field 58 contains 000. The DMA control signals produced by ASPs 12a–b designate the use of DMA request signal DMA0 but do not designate the use of DMA request signal DMA1. As a result, select logic 40 ignores external DMA request signal DRQ0 and produces DMA request signal DMA1 when external signal DRQ1 is asserted.

FIG. 4c is a block diagram of a preferred embodiment of status register 48 of ASP registers 36. Status register 48 includes the received bit 8 (RB8) described above and labeled bit 70 in FIG. 4c. In mode 3, ASP 12 stores the ninth data bit (bit $D_8$ in FIG. 1b) in a received bit 8 (RB8) bit 70 within status register 48. Status register 48 is assigned an address within the address space of microprocessor 10. The value of the ninth data bit received by an ASP 12 in mode 3 may be determined by reading the value of RB8 bit 70 within status register 48.

Figure 4D:
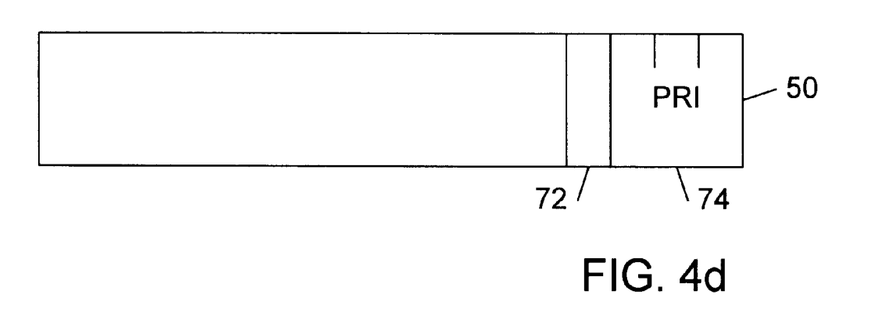
FIG. 4d is a block diagram of a preferred embodiment of an interrupt control register of the ASP registers of FIG. 4a, wherein the interrupt control register includes a interrupt mask bit which determines whether the corresponding ASP produces an ASP interrupt request signal, and an interrupt priority field which contains a number determining the priority of the ASP interrupt request signal relative to other interrupt request signals generated by other devices.

FIG. 4d is a block diagram of a preferred embodiment of interrupt control register 50 of ASP registers 36. Interrupt control register 50 includes an interrupt mask bit 72 and three contiguous bit locations defining an interrupt priority field 74. Interrupt mask bit 72 determines whether the corresponding ASP 12 produces an ASP interrupt request signal. When interrupt mask bit 72 is 0, the corresponding ASP 12 produces an ASP interrupt request signal upon the occurrence of certain internal conditions (e.g., parity error detected, framing error detected, overrun error detected, etc.). A parity error occurs for even parity when the number of received data bits having a value of 1 is odd and the parity bit is not set, and the occurs for odd parity when the number of received data bits having a value of 1 is even and the parity bit is not set. A framing error occurs when a stop bit is expected and the received value is a 0. An overrun error occurs when ASP 12 overwrites valid, unread data within receive register 54. When interrupt mask bit 72 is 1, the corresponding ASP 12 is prevented from producing an ASP interrupt request signal. The three bits of interrupt priority field 74 contain a number from 0 to 7 determining the priority of the ASP interrupt request signal relative to other interrupt request signals generated by other devices.

Figure 5:
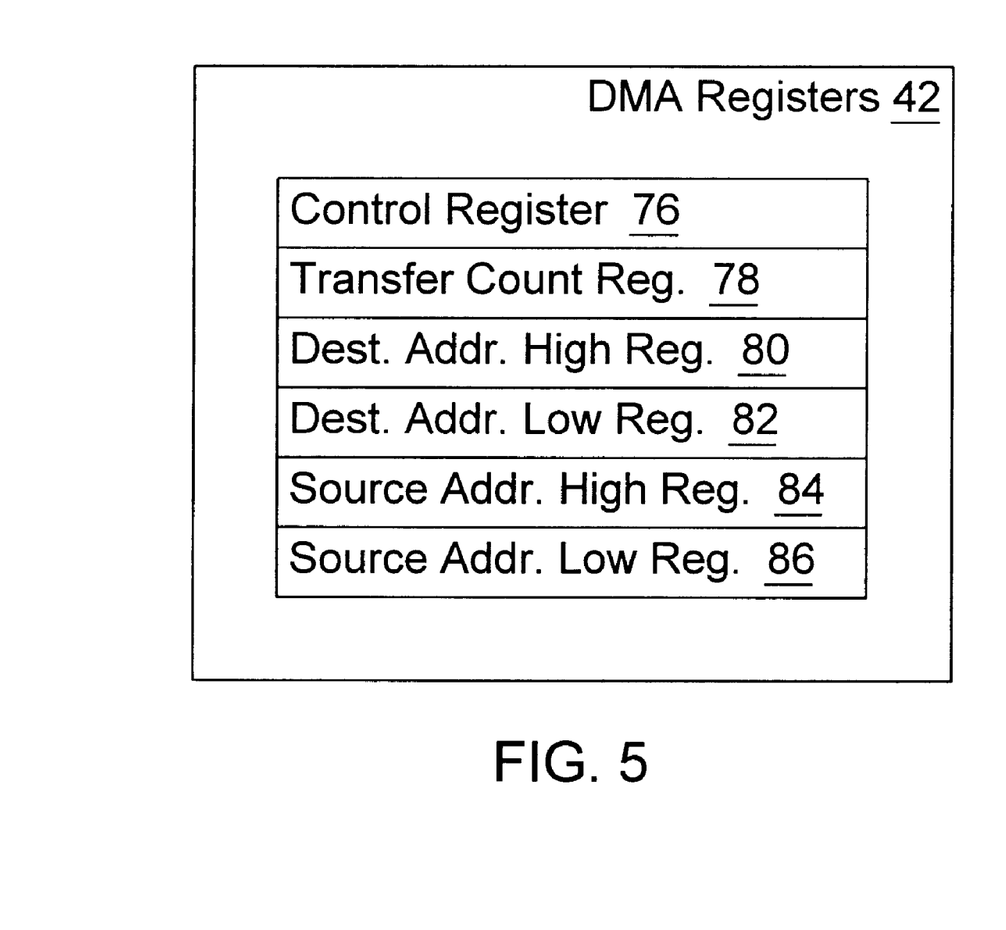
FIG. 5 is a block diagram of a preferred embodiment of DMA registers included within each DMA channel circuit of FIG. 3.

FIG. 5 is a block diagram of a preferred embodiment of DMA registers 42 included within each DMA channel 38. DMA registers 42 include a control register 76, a transfer count register 78, a destination address high register 80, a destination address low register 82, a source address high register 84, and a source address low 86. The contents of control register 46 determine the mode of operation of the corresponding DMA channel 38. During configuration of DMA channel 38, the number of data units (e.g., bytes) to be transferred is written into transfer count register 78. Transfer count register 78 is decremented after each data transfer, and DMA channel 38 activity terminates when the value stored within transfer count register 78 reaches 0. Prior to a DMA operation, destination address high register 80 is initialized to contain the highest-ordered bits of the address of the destination of the DMA transfer, and destination address low register 82 is initialized to contain the lowest-ordered bits of the address of the destination of the DMA transfer. Similarly, source address high register 84 is initialized to contain the highest-ordered bits of the address of the source of the DMA transfer, and source address low register 86 is initialized to contain the lowest-ordered bits of the address of the source of the DMA transfer. Following each data transfer, the destination and source addresses are either incremented or decremented.

Figure 6A:
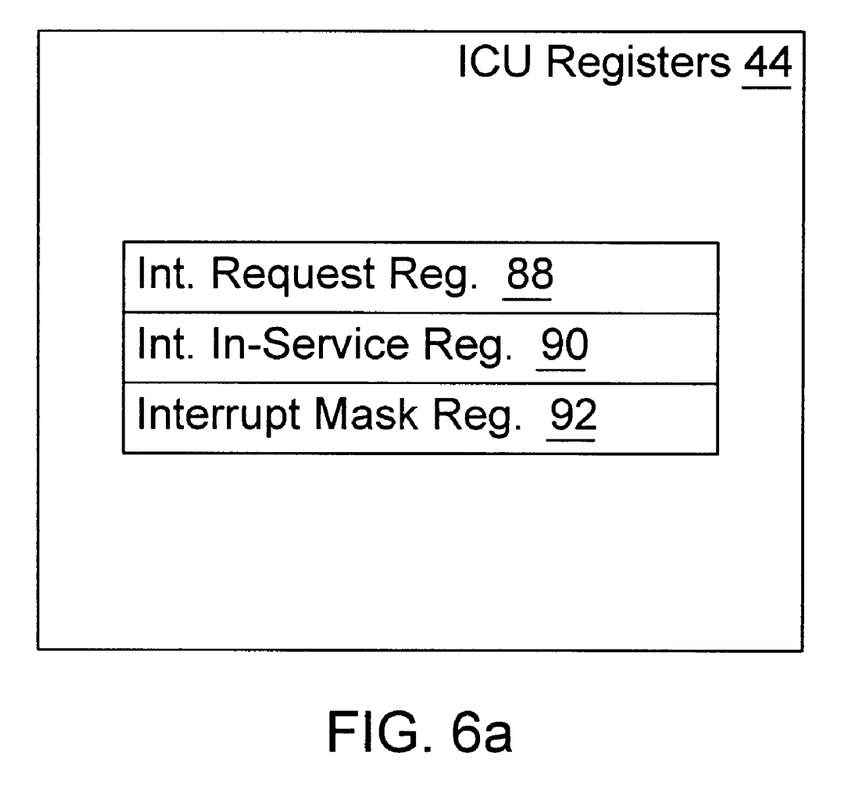
FIG. 6a is a block diagram of a preferred embodiment of ICU registers included within the ICU of FIG. 3.

FIG. 6a is a block diagram of a preferred embodiment of ICU registers 44 included within ICU 26. ICU registers 44 include an interrupt request register 88, an interrupt in-service register 90, and an interrupt mask register 92. Devices within or coupled to microprocessor 10 and capable of generating an interrupt request signal are assigned corresponding bit locations within interrupt request register 88, interrupt in-service register 90, and interrupt mask register 92. When a device generates an interrupt request signal, the corresponding bit within interrupt request register 88 is set to 1. When the interrupt request signal is responded to (i.e., taken), the corresponding bit within interrupt request register 88 is reset to 0 during an interrupt acknowledge operation, and the corresponding bit within the interrupt in-service register 90 is set to 1 by ICU 26. Programming the bit location corresponding to a given device within interrupt mask register 92 either enables or disables the interrupt request signal generated by the device.

Figure 6B:
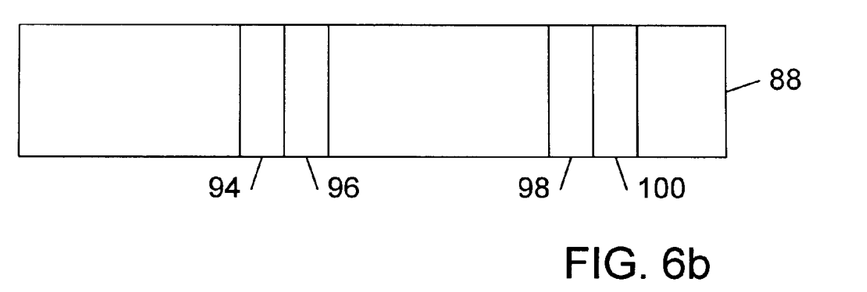
FIG. 6b is a block diagram of a preferred embodiment of an interrupt request register of the ICU registers of FIG. 6a, wherein the interrupt request register includes bit positions associated with each ASP and each DMA channel circuit, and wherein when an ASP or DMA channel generates an interrupt request signal, the corresponding bit position within the interrupt request register is set to 1.

FIG. 6b is a block diagram of a preferred embodiment of interrupt request register 88 of ICU registers 44. Interrupt request register 88 includes a bit 94 designated for ASP 12a, a bit 96 designated for ASP 12b, a bit 98 designated for DMA channel 38b, and a bit 100 designated for DMA channel 38a. Bit 94 is set to 1 when ASP 12a generates an ASP interrupt request signal. Bit 96 is set to 1 when ASP 12b produces an ASP interrupt request signal. When DMA channel 38b generates a DMA interrupt request signal, bit 98 within interrupt request register 88 is set to 1. Bit 100 is set to 1 when DMA channel 38a produces a DMA interrupt request signal. Interrupt request register 88 is a read-only register assigned an address within the address space of microprocessor 10. Reading the value stored within interrupt request register 88 yields the status of device interrupt request signals. Once set, individual bits within interrupt request register 88 are reset to 0 during an interrupt acknowledge operation.

Figure 6C:
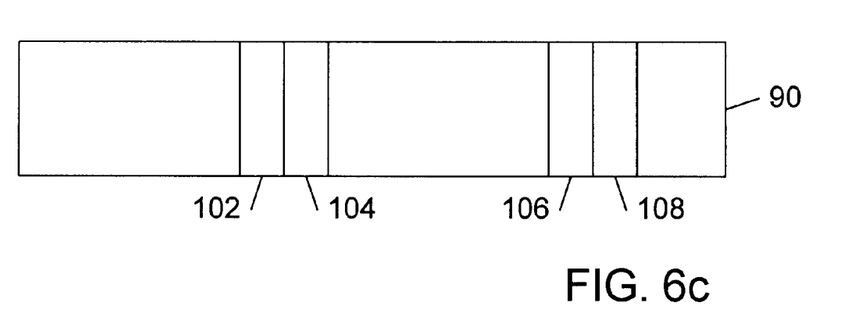
FIG. 6c is a block diagram of a preferred embodiment of an interrupt in-service register of the ICU registers of FIG. 6a, wherein the interrupt in-service register includes bit positions associated with each ASP and each DMA channel circuit, and wherein when an interrupt request signal generated by an ASP or DMA channel is responded to, the ICU sets the corresponding bit position within the interrupt request register to 1.

FIG. 6c is a block diagram of a preferred embodiment of interrupt in-service register 90 of ICU registers 44. Interrupt in-service register 90 includes a bit 102 designated for ASP 12a, a bit 104 designated for ASP 12b, a bit 106 designated for DMA channel 38b, and a bit 108 designated for DMA channel 38a. ICU 26 sets bit 102 to 1 when the ASP interrupt request signal generated by ASP 12a is taken. Bit 104 is set to 1 when the ASP interrupt request signal generated by ASP 12b is responded to. When the DMA interrupt request signal generated by DMA channel 38b is taken, ICU 26 sets bit 106 within interrupt in-service register 90 to 1. Bit 108 is set to 1 when the DMA interrupt request signal generated by DMA channel 38a is responded to. Once set, individual bits within interrupt in-service register 90 are reset to 0 following completion of the associated interrupt service routine.

Figure 6D:
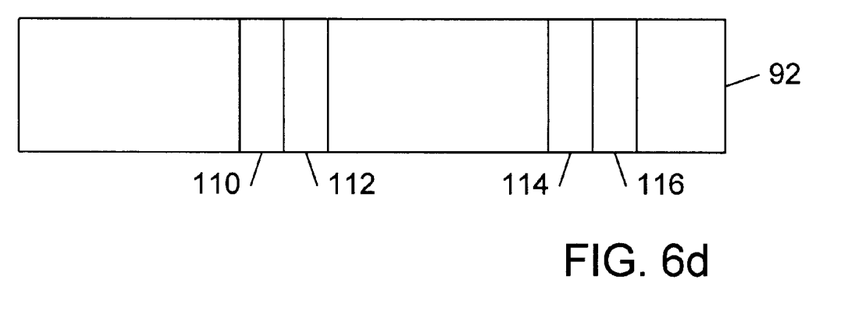
FIG. 6d is a block diagram of a preferred embodiment of an interrupt mask register of the ICU registers of FIG. 6a, wherein the interrupt mask register includes bit positions associated with each ASP and each DMA channel circuit, and wherein the value stored within a bit position of the interrupt mask register determines whether an interrupt request signal generated by the corresponding device is responded to or ignored.

FIG. 6d is a block diagram of a preferred embodiment of interrupt mask register 92 of ICU registers 44. Interrupt mask register 92 includes a bit 110 designated for ASP 12a, a bit 112 designated for ASP 12b, a bit 114 designated for DMA channel 38b, and a bit 116 designated for DMA channel 38a. Interrupt mask register 92 is assigned an address within the address space of microprocessor 10, and a value may be stored within interrupt mask register 92 by writing the value to the address assigned to interrupt mask register 92. When bit 110 is set to 0, the ASP interrupt request signal generated by ASP 12a is enabled. The ASP interrupt request signal generated by ASP 12b is enabled when bit 112 is set to 0. When bit 114 is set to 0, the DMA interrupt request signal generated by DMA channel 38b is enabled. The DMA interrupt request signal generated by DMA channel 38a is enabled when bit 116 is set to 0.

It will be appreciated by those skilled in the art having the benefit of this disclosure that this invention is believed to be a microcontroller which is configurable to transfer data to and from one or more asynchronous serial ports (ASPs) using direct memory access (DMA), and having hardware features which cause each ASP to notify the microprocessor core (i.e., execution unit) when a data frame having a last data bit equal to a predetermined value is received. Such hardware features allow the execution unit to determine when complete data packets are received. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A microcontroller formed upon a single monolithic semiconductor substrate, comprising:
an asynchronous serial port (ASP) adapted to receive serial communication data, wherein the serial communication data comprises at least one data frame, and wherein each data frame comprises a plurality of data bits transmitted sequentially between a start bit and one or more stop bits, and wherein the ASP is configurable to generate an ASP interrupt request signal when the value of the last of the plurality of data bits is equal to a predetermined value and to not generate an ASP interrupt request signal when the value of the last of the plurality of data bits is not equal to the predetermined value.

2. The microcontroller as recited in claim 1, wherein the last of the plurality of data bits is transmitted immediately before the one or more stop bits.

3. The microcontroller as recited in claim 1, wherein the ASP is configurable to generate the ASP interrupt request signal when the last of the plurality of data bits is set to 1.

4. The microcontroller as recited in claim 1, wherein the plurality of data bits includes eight bits of a data unit and a last ninth bit transmitted immediately before the one or more stop bits.

5. The microcontroller as recited in claim 4, wherein the ASP is configurable to generate the ASP interrupt request signal when the ninth data bit is set to 1.

6. The microcontroller as recited in claim 1, wherein the ASP is further configurable to generate an internal direct memory access (DMA) request signal in response to the serial communication data.

7. The microcontroller as recited in claim 6, further comprising a DMA unit, wherein the DMA unit is coupled to receive the DMA request signal and configurable to perform a data transfer operation in response to the DMA request signal.

8. The microcontroller as recited in claim 7, wherein the data transfer operation comprises reading data from a first address and writing the data to a second address.

9. The microcontroller as recited in claim 1, wherein the ASP comprises at least one configuration register, wherein operation of the ASP is configured according to the contents of the at least one configuration register, and wherein the ASP is configured to generate an interrupt request signal for each data frame if the contents of the at least one configuration register indicate a non-DMA mode.

10. The microcontroller as recited in claim 9, wherein generation of the ASP interrupt request signal is determined by the contents of at least one bit position within the at least one configuration register.

11. A microcontroller formed upon a single monolithic semiconductor substrate, comprising:
an asynchronous serial port (ASP) adapted to receive serial communication data, wherein the serial communication data comprises at least one frame, and wherein each data frame comprises a plurality of data bits transmitted sequentially between a start bit and one or more stop bits, and wherein the ASP is configurable to generate an ASP interrupt request signal when the value of the last of the plurality of data bits is equal to a predetermined value, and wherein the ASP is configurable to generate an internal direct memory access (DMA) request signal in response to the serial communication data;
a DMA unit coupled to receive the DMA request signal, wherein the DMA channel circuitry is configurable to perform a data transfer operation in response to the DMA request signal;
an interrupt control unit coupled to receive the ASP interrupt request signal and configured to produce an interrupt request signal in response to the ASP interrupt request signal; and
an execution unit coupled to receive the interrupt request signal and configured to execute instructions, wherein the execution unit executes a predefined set of instructions in response to the interrupt request signal.

12. The microcontroller as recited in claim 11, wherein the last of the plurality of data bits is transmitted immediately before the one or more stop bits.

13. The microcontroller as recited in claim 11, wherein the ASP is configurable to generate the ASP interrupt request signal when the last of the plurality of data bits is set to 1.

14. The microcontroller as recited in claim 11, wherein the plurality of data bits includes eight bits of a data unit and a last ninth bit transmitted immediately before the one or more stop bits.

15. The microcontroller as recited in claim 14, wherein the ASP is configurable to generate the ASP interrupt request signal when the ninth data bit is set to 1.

16. The microcontroller as recited in claim 11, wherein the ASP is further configurable to generate an internal direct memory access (DMA) request signal in response to the serial communication data.

17. The microcontroller as recited in claim 16, further comprising a DMA unit, wherein the DMA unit is coupled to receive the DMA request signal and configurable to perform a data transfer operation in response to the DMA request signal.

18. The microcontroller as recited in claim 17, wherein the data transfer operation comprises reading data from a first address and writing the data to a second address.

19. The microcontroller as recited in claim 1, wherein the ASP comprises at least one configuration register, wherein operation of the ASP is configured according to the contents of the at least one configuration register, and wherein the ASP is configured to generate an interrupt request signal for each data frame if the contents of the at least one configuration register indicate a non-DMA mode.

20. The microcontroller as recited in claim 19, wherein generation of the ASP interrupt request signal is determined by the contents of at least one bit position within the at least one configuration register.

21. The microcontroller as recited in claim 11, wherein the ASP is also configurable to generate the ASP interrupt request signal upon the occurrence of certain internal conditions during the performance of a data transfer operation by the DMA unit.

22. The microcontroller as recited in claim 21, wherein the internal conditions include detection of a parity error, detection of a framing error, and detection of an overrun error.

* * * * *